Jan. 12, 1937. E. J. KINGSBURY 2,067,491
MACHINE TOOL INCLUDING FLUID OPERATED FEEDING DEVICES
Filed Jan. 6, 1934 3 Sheets-Sheet 1

INVENTOR
Edward J. Kingsbury
BY
ATTORNEYS.

Jan. 12, 1937. E. J. KINGSBURY 2,067,491
MACHINE TOOL INCLUDING FLUID OPERATED FEEDING DEVICES
Filed Jan. 6, 1934 3 Sheets-Sheet 2

INVENTOR
Edward J. Kingsbury
BY
ATTORNEYS.

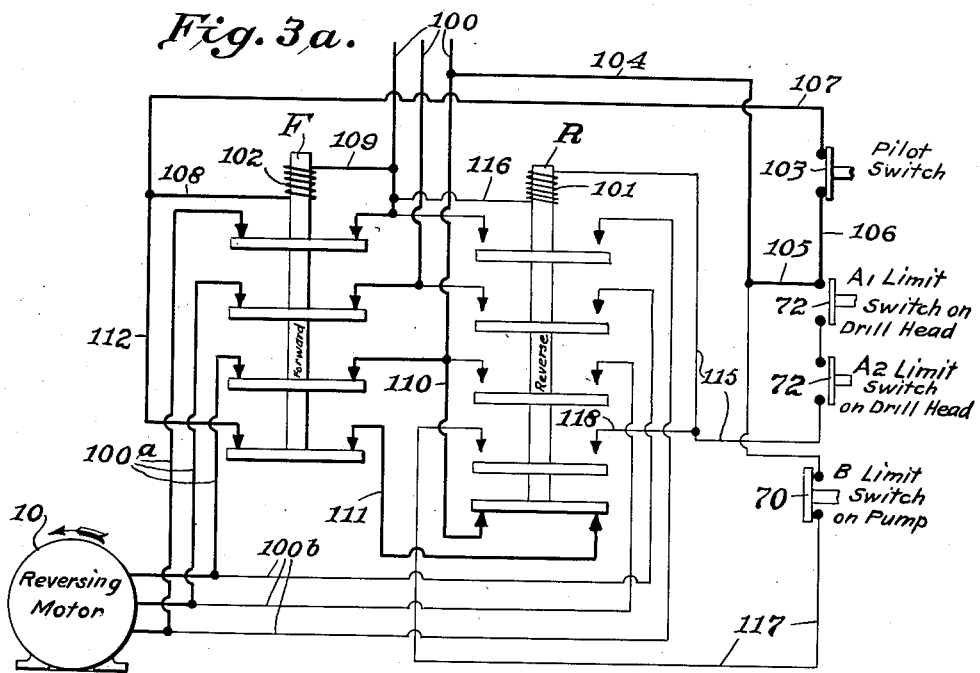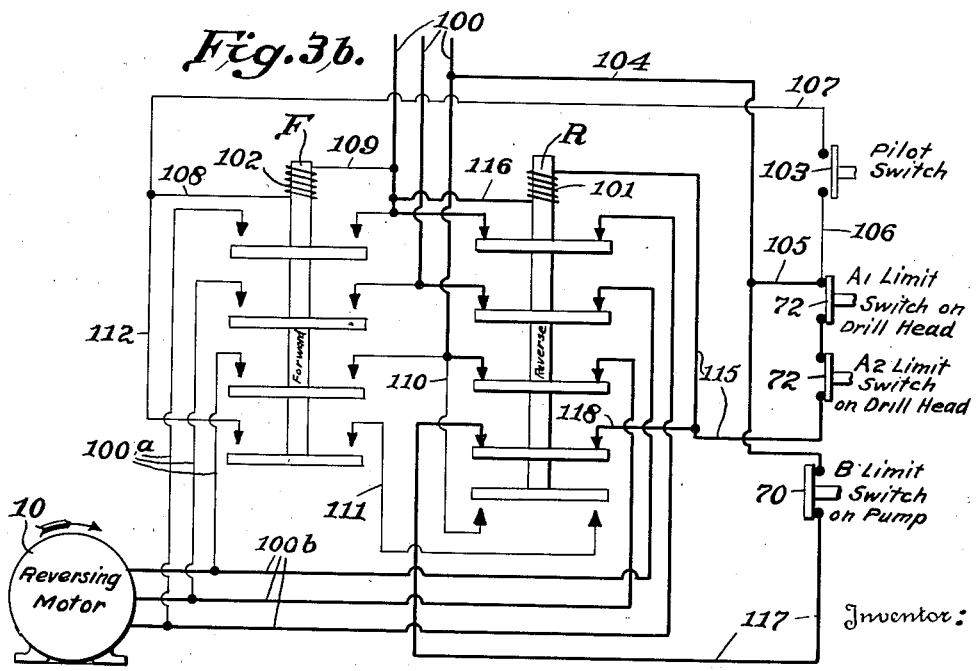

Patented Jan. 12, 1937

2,067,491

UNITED STATES PATENT OFFICE 2,067,491

MACHINE TOOL INCLUDING FLUID OPERATED FEEDING DEVICES

Edward Joslin Kingsbury, Keene, N. H.

Application January 6, 1934, Serial No. 705,607

19 Claims. (Cl. 60—52)

The present invention relates to improvements in machine tools having fluid operated feeding devices, and is more particularly directed to the provision of a fluid operated feeding system including a pump and means for operating the pump in accordance with the requirements of the feeding system.

One of the features of the present invention is the provision of a machine tool in which a moving structure is fed by hydraulic means, the fluid pressure being produced by a pump which is controlled in its operation by the movement of the structure being fed.

Another feature of the present invention is the provision of a machine tool having a plurality of separately movable members each provided with fluid operated feeding means, and a common source for producing the fluid movement which actuates the moving structures, this common source being controlled by the movements of the moving structure.

A further feature of the present invention is the provision of a machine tool in which is provided a moving structure and a fluid operated means for feeding the same, the feeding in one direction being accomplished by fluid under pressure being delivered to the fluid operated means, and the feeding in the reverse direction being accomplished by withdrawal of fluid from the fluid operated means, the delivery and withdrawal of the fluid being accomplished by a pump system under control of the movements of the movable structure and of the pump itself.

Other features of the present invention will appear in the course of the following specification and claims, in conjunction with the accompanying drawings which show an illustrative form of practicing the invention, and in which a hydraulic system is employed for the fluid delivery, withdrawing and operating system.

In these drawings:—

Figures 3a and 3b show similar diagrams with the parts in positions for forward and reverse movement.

Figure 1:
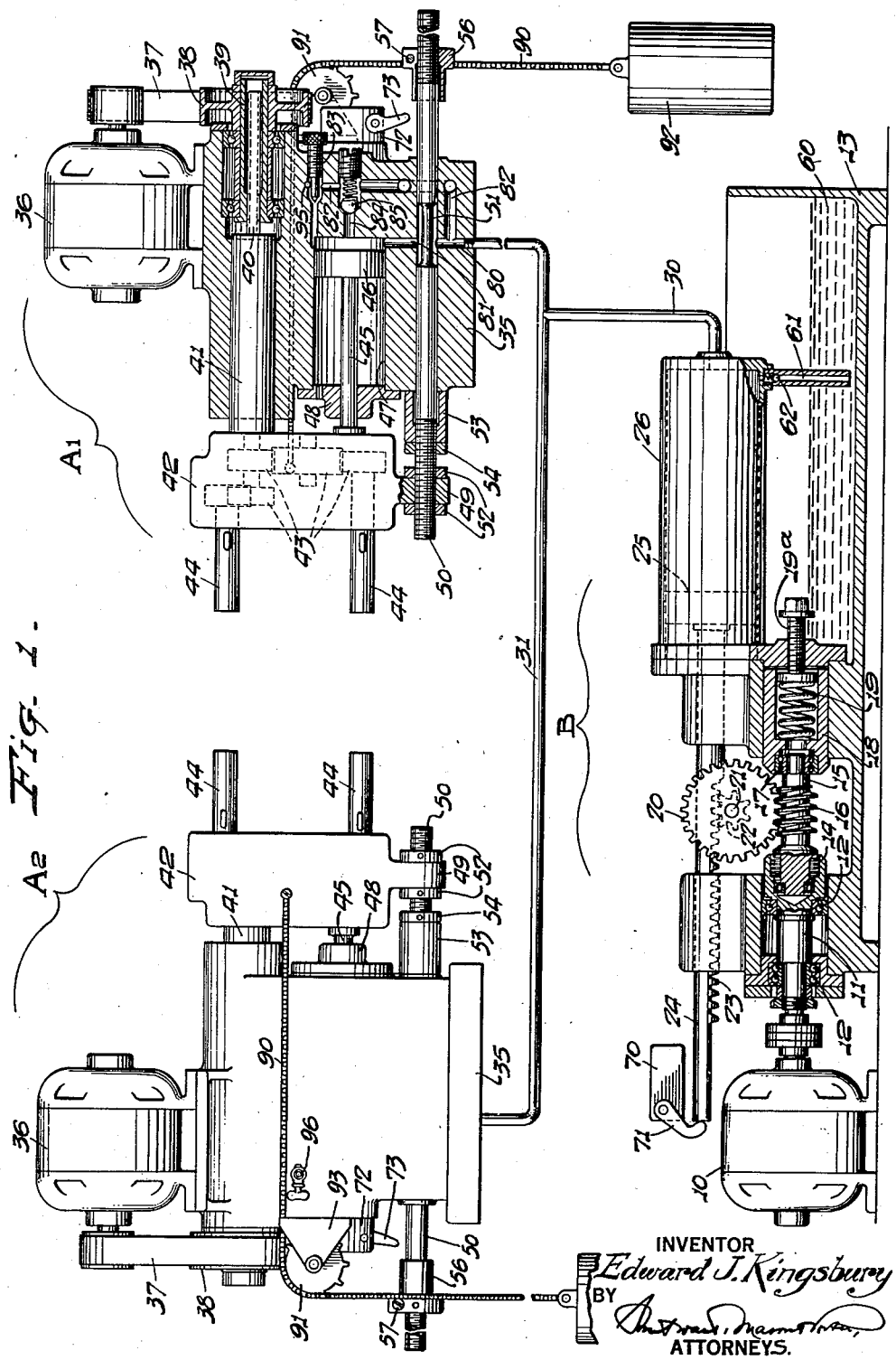
Figure 1 is a diagrammatic view, with illustrative parts in section, showing the assembly of a machine tool of the present nature, in which a pair of tool units having separate movable tool heads are provided in conjunction with a common pump for moving the fluid.

In the drawings, two tool units A1, A2 are shown as being identical in design, and are illustrated as having tool heads which are fed toward one another during the operation of the two tool units. A common pump system B is provided for delivering fluid to the units and withdrawing it therefrom, in multiple.

The pump system comprises in the illustrative form a reversible electric motor 10 connected to a shaft 11 carried by bearings 12 in a pump system frame 13. A friction clutch 14 connects the shaft 11 with a shaft extension 15 having a worm 16 thereon and mounted in a bearing 17 carried by a sliding member 18 movable in the frame 13 in the axial direction of shaft 11, this member 18 being hollow to receive a pressure spring 19 which is adjusted by a screw 19a, and which serves constantly to press the shaft 15 toward the left so that the clutch 14 establishes a driving relation with shaft 11.

The worm 16 is in mesh with a worm wheel 20 on a shaft 21 having a pinion 22 thereon meshing with a rack 23 provided on the pump piston rod 24 which is guided in the frame 13 and is provided with a piston 25 within the cylinder structure 26 carried by the frame 13. The rightward movement of piston 25 causes the fluid within the cylinder 26 to be ejected through the common conduit 30 to a manifold conduit 31 which is joined to both tool units A1 and A2.

These two tool units are illustrated as identical in construction. Each of them has a fixed frame portion 35 which may be secured to any desired support and in the proper location opposite the fixture or other device (not shown) which is provided to support the work to be operated upon. Each frame 35 supports the individual motor 36 which is connected by a belt 37 to the pulley 38 on a splined sleeve 39 journaled in the frame 35 and in driving relationship with the tool driving shaft 40 which extends through a bearing piece 41 likewise guided in frame 35 and is connected to the movable tool head 42. These tool heads are illustrated as containing gears 43 by which the tool spindles 44 are driven constantly from the individual motors 36.

The movement of the tool head 42 away from the corresponding frame 35 is illustrated in the figures as being the forward feeding movement. This movement is effected by the piston rod 45 which is connected to the tool head 42 and has a piston 46 thereon in the cylinder space 47 provided in frame 35. A closing cap 48 is provided for the cylinder space.

Each of the tool heads 42 is provided with a downward extension 49 which receives a valve rod 50 which is threaded at both its ends and is provided with a reduced portion 51 within the frame 35. Lock nuts 52 clamp the valve rod 50 to the extension 49, so that the reduced portion 51 may be adjusted to a desired distance from the extension 49, whereby to control the point at which the rapid forward feeding movement is modified to a slow forward feeding movement as will be described hereinafter. A spacer sleeve 53 and a lock nut 54 are likewise threaded on the valve rod 50 and cooperate with the frame 35 to determine the position of maximum withdrawal of the tool head 42 with respect to the frame 35 and the work. A split sleeve 56 is likewise threaded to the valve rod 50, at the opposite end thereof, and may be clamped at its adjusted position by the clamping screw 57; and operates by engagement with the frame 35 to limit the forward feeding movement of the tool head (in position of Fig. 2).

The pump system frame 13 is provided with walls providing a sump 60 for oil or like liquid, and a supply pipe 61 establishes communication of the cylinder 26 with the oil in this sump, a check valve 62 being provided to prevent direct return movement of the liquid from the cylinder to the sump.

A limit switch 70 having a rocker arm 71 is operated by the pump piston rod 24 when the latter reaches its extreme leftward movement (Fig. 1) whereby to open a control circuit. Limit switches 72 are provided on each of the tool units A1 and A2 and have rocker arms 73 which are engaged by the enlarged portions of the split sleeves 56 shortly before these sleeves encounter the corresponding frames 35, whereby to close the switches 72.

Within each of the frames 35 is provided a passage 80 in extension of the manifold conduit 31 and communicating with the hole in which the valve rod 50 moves, so that when the reduced portion 51 thereof is opposite the passage 80 (Fig. 1) the fluid may flow further through a passage 81 into the cylinder space 47 and cause a movement of the piston 46 toward the left for tool unit A1. This leftward movement of the piston 46 enforces a leftward movement of the corresponding tool head 42 and therewith of the corresponding valve rod 50, so that ultimately the reduced portion 51 passes from the passages 80 and 81, and this direct flow of fluid medium is shut off. A primary by-pass conduit 82 leads from passage 80 and opens into the cylinder space 47 near the top thereof, and has therein an externally adjusted metering valve 83 which controls the flow of fluid under pressure from the manifold conduit 31 into the cylinder space 47, to restrict the rate of movement of the piston 46 under such condition.

When the pressure in manifold conduit 31 falls below the pressure in cylinder space 47 to the right of piston 46 in tool A1, fluid tends to move in the opposite direction from the cylinder toward the manifold conduit, and is then permitted to move through passage 84 and check valve 85 to conduit 82, so that a rapid return feeding movement is attained. The return movement of the tool head 42 is assisted by the operation of the chain 90 passing over sprocket 91 and connected to a counter-weight 92; the sprocket 91 being journaled on a bracket 93 of frame 35.

At the highest point of conduit 82 is provided a lateral conduit 95 leading to an external pet-cock 96; so that air may be evacuated from the system.

Figure 3:
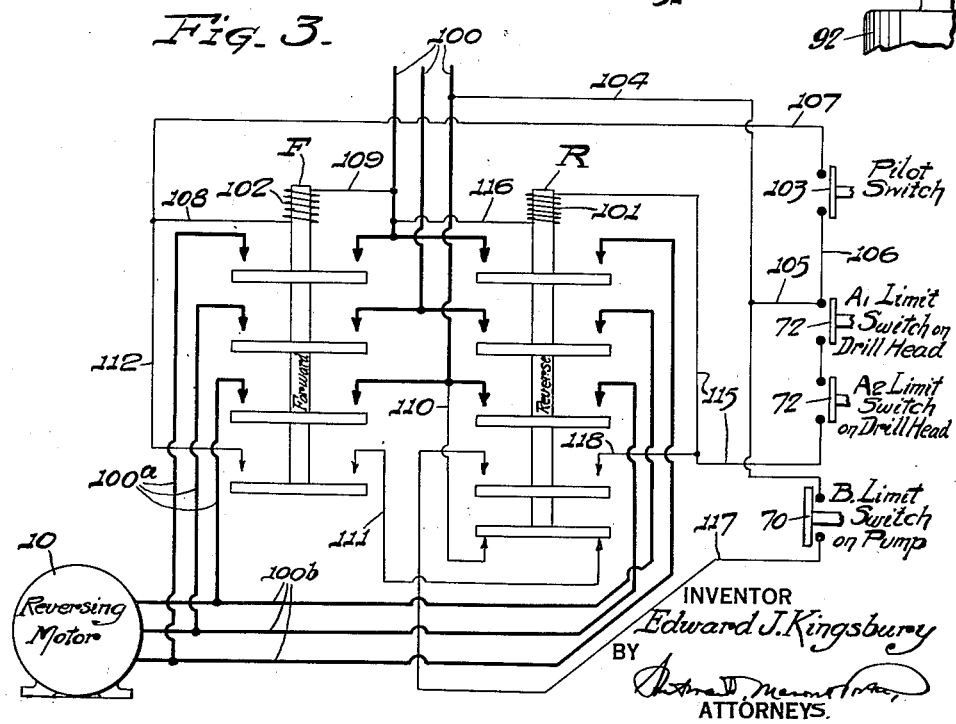
Figure 3 is a circuit diagram.

In the circuit diagram of Figure 3, the reversing motor 10 is illustrated as of three-phase type. The three-phase conductors 100 are alternately and selectively connected to the motor 10 by the operation of the reverse relay R and the forward relay F, having the respective energizing coils 101 and 102. A pilot switch 103 is employed to start the system from the initial position shown in Figure 1. Upon closing the pilot switch 103, current flows from one phase conductor 100 by conductors 104 and 105 and the switch conductor 106, through the switch 103, by conductors 107 and 108 to the coil 102 and back by conductor 109 to another phase conductor 100. The relay F is energized and its contact bridges are raised to connect the phase conductors 100 through branch phase conductors 100a to the reversing motor 10 which begins to turn in a forward direction. This condition is shown in Fig. 3a, which also indicates the closed position of the pilot switch 103 for initiating such movement. The closing of the lower bridge of relay F also establishes a maintaining circuit from a phase conductor 100 by conductor 110, the lowered bottom bridge of open relay R, conductor 111, the raised and closed bottom bridge of relay F, conductors 112 and 108, through coil 102 and back by conductor 109 to a phase conductor 100.

In this position of the electrical parts, the motor 10 drives shaft 11, and clutch 14 is held closed by spring 19 so that worm 16 turns the worm wheel 20 and thus the pinion 22 and rack 23 cause the piston 25 to move toward the right in Figure 1 and force fluid through conduits 30 and 31 to the tool units A1 and A2. In each unit, the fluid flows past the reduced portion 51 of the valve rod 50 and directly enters the cylinder space 47 through passage 81 and the tool heads 42 are pushed away from the frames 35 at a rapid rate in a forward feeding movement. These rates may not be identical. Ultimately, the valve rods 50 withdraw the reduced portions 51 from between passages 80 and 81, and thereafter only a slow feeding movement can be produced owing to the operation of the metering valves 83. The quantity of fluid required per unit of time is thus reduced, and the back pressure on pump piston 25 increases, along with its reaction on pump piston rod 24 and thus on the worm wheel 20 and worm 16. Ultimately, this slow forward feeding movement of the individual unit is stopped by the engagement of the split sleeve 56 with the frame 35, and simultaneously the limit switch 72 of the unit is closed. The tool head 42 is thus brought to a standstill at a position which may be closely regulated by setting the split sleeve 56, and thereafter no further liquid is received by the cylinder space 47 and a high back pressure builds up in conduits 31 and 30 and thus in the cylinder 26. According to the setting of the adjusting screw 19a, the pressure between the worm wheel 20 and the worm 16 attains such a value that the worm 16 is forced toward the right against the spring 19 and thus releasing the clutch 14. The motor 10 is thus substantially disconnected from the piston 25, but a succeeding movement of the piston 25 will reestablish the engagement, and this controlled transmission occurs so long as the motor 10 is turning in the forward direction, and liquid is being accepted by the tool units.

Figure 2:
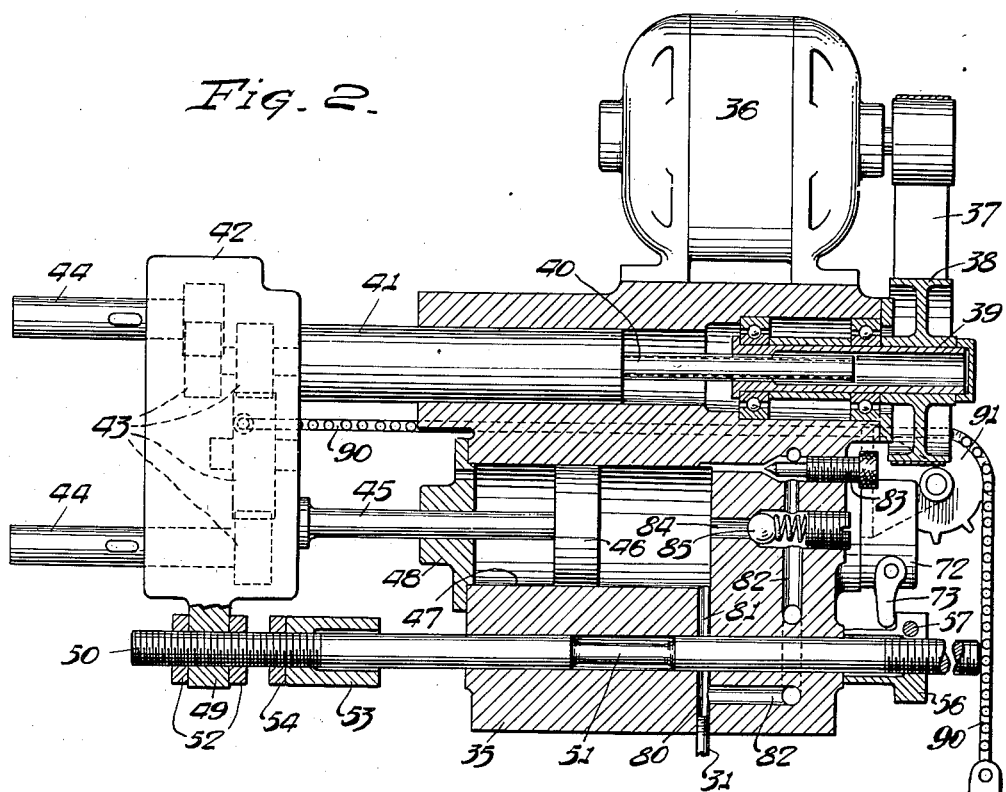
Figure 2 is a view, on a larger scale, showing one of the tool units in a different operated position.

The tool unit has now attained the position shown in Figure 2.

The closing of the limit switches 72 has established a further circuit from a phase conductor 100 by conductors 104, 105, through the two limit switches 72, by conductor 115, through coil 101 of reversing relay R and by a conductor 116 back to another phase conductor 100. Reversing relay R is energized and its bottom bridge now lifts and breaks the maintaining circuit through conductors 110 and 111, so that coil 102 of the forward relay F is deenergized, and forward relay F drops and breaks the connection between phase conductors 100 and 100a. The lifting of reversing relay R immediately closes circuits from the phase conductors 100 to the motor feeding phase conductors 100b, but with reversing connection to two of the phase conductors, so that the motor 10 is now energized in the reverse direction, and is thus brought into motion in the opposite direction. This condition is illustrated in Fig. 3b with the unit limit switches 72 and the pump limit switch 70 closed; and the motor 10 turning in the reverse direction from that illustrated in Fig. 3a. A maintaining circuit is also established from a phase conductor 100 by conductor 104, pump limit switch 70, conductor 117, the next-to-the-bottom bridge of relay R, and conductors 118 and 115 to the coil 101.

The reverse movement of the motor 10 causes the worm 16 to remain engaged with the worm wheel 20 and thus to cause the piston rod 24 to be moved toward the left in Figure 1, so that piston 25 sucks the liquid from the two tool units. At first, this suction occurs past the metering valve 83 and the conduit 82 of each unit, along with a flow past the check valve 85 thereof, so that the tool head 42 is drawn rapidly back toward the withdrawn position. The valve rod 50 is moved with the tool head and ultimately the reduced portion 51 again comes between the passages 80 and 81, and a direct flow back from the cylinder space 47 through conduits 31 and 30 to cylinder 26 occurs. Finally, the spacing member 53 encounters the frame 35 and brings the tool head to a standstill in its withdrawn position.

Ultimately, the pump piston rod 24 encounters rock arm 71 and opens the pump limit switch 70, and the maintaining circuit by conductors 104 and 117, the next-to-the-bottom bridge of relay R and conductor 118 is broken, so that the reverse relay drops to open position. The reversing motor 10 thus comes to a standstill and so remains until the pilot switch 103 is closed again, which may be accomplished manually or automatically according to the design of the associated mechanisms.

It will be noted that the tool units A1 and A2 may be mounted at any desired position and relation to one another by having the conduits 30 and 31 of extensible or flexible nature, so that the tool units may be assembled upon a standard containing the pump system B.

If at any time air tends to accumulate in the conduit and passage systems, the petcocks 96 may be opened while the piston 25 is moving toward the right (Fig. 1), and then the air is ejected from the collection conduit 95. When oil appears at the petcocks, they are closed. During the succeeding leftward movement of the piston 25, its complete movement is permitted by the sucking of replacement liquid from sump 60 through pipe 61 past the check valve 62.

It is obvious that the invention is not limited to the illustrative example of practice shown, but that it may be employed within many ways of the scope of the appended claims.

Having thus described the invention, what I claim as new and desire to secure by Letters Patent, is:—

1. A machine tool including a plurality of separate tool units each having a tool structure which is fed forward for cutting and fed backward for withdrawal and each including fluid-pressure-operated means for feeding, a reversible fluid-pressure pump, conduit means connecting said pump with all the fluid-pressure-operated means, a reversible source of power, and transmission means including a slip clutch connecting said source and said pump so that said source and transmission means operate through the slip clutch to determine the maximum pressure in said conduit means.

2. A machine tool including a plurality of separate tool units each having a tool structure which is fed forward for cutting and fed backward for withdrawal and each including fluid-pressure-operated means for feeding, a fluid-pressure pump, conduit means connecting said pump directly with all the fluid-pressure-operated means, a reversible source of power, transmission means including a slip clutch connecting said source and said pump, and means operated by said tool units for reversing said source of power and thereby reversing said pump after each unit has completed its cutting operation whereby to cause a reverse movement of fluid in said conduit means and to effect a withdrawal of said tool structures.

3. A machine tool including a tool unit having a tool structure which is fed forward for cutting and fed backward for withdrawal and including a single-action cylinder and piston for feeding said structure, a single-action pump including a cylinder and piston, a conduit connecting said cylinders, a valve moved with said tool structure to close said conduit, a by-pass conduit around said valve and a metering valve for controlling the flow of fluid therethrough, a reversible source of power connected to said pump to move the same, limit devices on said units operated at the end of the forward feeding thereof, limit devices on the pump operated at the end of the withdrawal movement thereof, and devices controlled by said limit devices for reversing and stopping said source of power.

4. A machine tool as in claim 3, in which the source is connected to the pump through a connection which slips at a predetermined maximum pressure in said conduit, and a further conduit is provided for communication from said connecting conduit to said feeding cylinder, and a check valve in said further conduit for preventing flow therethrough to said cylinder and permitting such flow from the cylinder whereby a rapid withdrawal feeding movement is attained.

5. A machine tool including a plurality of separate tool units each having a tool spindle and means for driving the same, fluid-operated feeding means for advancing the spindle for cutting operation of the tool thereon, and counterbalance means for exerting a returning force upon said spindle to withdraw the same to a non-cutting position, a common mechanism for moving fluid for all said fluid-operated feeding means including a pump and driving means therefor, and a single conduit connecting said pump with all said feeding means so that the movement of fluid from said pump through said conduit to the feeding means will produce a forward movement of all said spindles and a return movement of fluid through said conduit will effect a withdrawal movement of all said spindles; and controlling means interconnecting said units and common mechanism for controlling the direction of movement of fluid in said conduit for the advancing and withdrawal of the spindles, and including parts in each tool unit for initiating the withdrawal of said spindles at substantially the same time after all said units have completed their advancing movement.

6. A machine tool including a plurality of separate tool units each having a tool spindle and means for driving the same, fluid-operated feeding means for advancing and withdrawing the spindle, and individual means on each unit for restricting the flow of fluid whereby to produce a slow movement; a common mechanism for moving fluid connected to all said feeding means and including a pump, a reversible source of power, and a transmission connecting said pump and source and including a connection which slips when the pump requires more than a predetermined amount of energy for its continued movement; and control means interconnecting said units and common mechanism for reversing said source at the end of the advancing movement of all said spindles.

7. A machine tool including a tool unit having a fluid-operated motive means for feeding the tool forward and back, a pump and a single conduit from said pump to said motive means, a reversible source of power, means for reversing said source at the completion of the forward movement, and a transmission connecting said source and pump to operate the latter and including a clutch which slips when more than a predetermined maximum pressure is transmitted thereto during the forward feeding, and means for adjusting the clutch with respect to said maximum pressure transmitted thereby, whereby to regulate the feeding pressure existing in said motive means.

8. A machine tool including a tool unit having a fluid-operated motive means for feeding the tool forward and back, a pump and a conduit from said pump to said motive means, a reversible source of power, means in the unit for varying the rate of consumption of fluid by said motive means, a transmission connecting said source and pump to operate the latter and including a clutch which slips when the pressure in said conduit attains a predetermined maximum, and a control device actuated by the unit for connecting the source for reversed energization after a predetermined forward movement of the tool.

9. A machine tool including a tool unit, fluid-operated motive means for producing relative feeding movements of the tool and work, a pump and a conduit from said pump to said motive means, a reversible source of power, means in the unit for varying the rate of consumption of fluid by said motive means, a transmission connecting said source and pump to operate the latter and including a clutch which slips when the pressure in said conduit attains a predetermined maximum, and a control device actuated by the pump after a predetermined movement thereof in one direction for terminating the pump movement in said direction.

10. In a machine tool, fixed and movable structures, piston and cylinder feeding means connected to said structures for producing relative movements thereof, a pump including piston and cylinder means, conduit means connecting said cylinder means and providing therewith a substantially liquid tight system, means for restricting the relative movement of said structures, a source of power and a transmission therefrom to said pump, control devices actuated at the end of the restricted relative movement of said structures in one direction for producing a reversal of the drive of said pump from said source, slip means included in said transmission and operative at a predetermined pressure in said conduit means to determine the actuation of said pump for moving said structures relatively in said one direction, and means operated by the movable structure for producing a reversal of the pump movement after a predetermined travel of said movable structure and thereby effecting a relative movement of said structures in the other direction.

11. In a machine tool, fixed and movable structures, single-action piston and cylinder feeding means connected to said structures for producing relative movements thereof, a pump including single-action piston and cylinder means, a single conduit connecting said cylinder means and providing therewith a substantially liquid-tight system in which liquid is moved back and forth to and from said pump and feeding means, means for restricting the relative movements of said structures, means for moving the pump piston back and forth and operating at a predetermined pressure in said conduit means to release the driving of said pump while the pump piston is operating to force liquid toward said feeding means, and control devices actuated at the end of the restricted relative movement of said structures caused by the forcing of liquid into said feeding means and operating to determine thereafter a reversed movement of said pump.

12. In a machine tool, fixed and movable structures, fluid-pressure-operated means for moving said movable structure in one direction, a pump for delivering fluid to said fluid-operated means under pressure to effect said movement, a reversible motor, means including a slip clutch connecting said motor and pump, means controlling the clutch to effect a disconnection of the motor and pump upon a predetermined maximum pressure in the latter, first means actuated upon a predetermined movement of the movable structure in said one direction for reversing the motor and effecting movement of said movable structure in the other direction, and second means connected with said first means and actuated upon a predetermined movement of the pump for terminating the movement of said movable structure in said other direction.

13. In a machine tool, fixed and movable structures, fluid-operated means for moving said movable structure, a pump for delivering fluid to and withdrawing it from said fluid-operated means to effect the reciprocation thereof, a reversible motor, means including a slip clutch connecting said motor and pump, means controlling the clutch to effect a disconnection of the motor and pump upon a predetermined maximum pressure in the latter, first means actuated upon a predetermined movement of the movable structure in said one direction for reversing the motor and effecting movement of said movable structure in the other direction, and second means connected with said first means and actuated upon a predetermined movement of the pump for terminating the movement of said movable structure in said other direction.

14. A machine tool including a plurality of separate tool units each having a tool spindle and means for driving the same, yielding means for independently feeding each of said spindles forward, a reversible power driven means connected to all said yielding means and operating during forward movement for feeding all said spindles forward and during reverse movement for returning all said spindles, devices interconnecting all said units and power driven means for producing a reversal of said power driven means when each spindle has attained its extreme forward position, and devices cooperating with said interconnecting devices and actuated by the power driven means at a limit of reverse movement thereof for terminating such reverse movement.

15. A machine tool including a plurality of separate tool units each having a tool spindle which is moved forward for cutting and backward for withdrawal and each including yielding means for moving the spindle, a single reversible power means connected to all said yielding means for moving the same and including clutch devices for slipping when the combined resistance of all said spindles exceeds a predetermined value, control devices on said units, and means interconnecting the same with said power means for reversing the latter when all said units have attained a forward position predetermined for each said unit and thereby effect a simultaneous backward movement of all said spindles.

16. A machine tool including a plurality of separate tool units each having a tool spindle which is moved forward for cutting and backward for withdrawal and each including yielding means for moving the spindle, a single power-driven means connected to all said yielding means and operative therethrough during its movement in one direction to move all said spindles forwardly and during its movement in the opposite direction to move all said spindles backwardly, a reversible source of power for said power-driven means, control devices on said units and means interconnecting the same with said power-driven means for reversing the said source of power when all said units have attained a forward position predetermined for each said unit and thereby effect a simultaneous backward movement of all said spindles and operating for holding the spindles thereafter in withdrawn position for terminating the reverse movement after a predetermined movement of the power-driven means.

17. A machine tool including a plurality of separate tool units each having a tool structure which is fed forward for cutting and fed backward for withdrawal and each including relatively reciprocable piston and cylinder means for feeding, a pump including relatively reciprocable piston and cylinder means, conduit means establishing communication between all said cylinder means so that relative movement of the pump piston in one direction can produce simultaneous forward movement of all said tool structures and movement of the pump piston in the opposite direction can produce simultaneous backward movement of all said tool structures, a reversible source of power and transmission means including a slip clutch connected to said pump, said slip clutch operating to determine the maximum pressure in said conduit means, and devices controlled by said units for reversing said source when all said units have attained an individually predetermined forward position.

18. In a machine tool including a plurality of separate tool units each having a tool structure which is fed forward for cutting and fed backward for withdrawal and each including a fluid-pressure-operated means for feeding the tool structure and means for regulating the supply of fluid to said fluid-pressure-operated means, a pump, single conduit means connecting the pump and all said fluid-pressure-operated means and including said regulating means, means for driving said pump, and control devices for reversing said driving means and operating to move the pump alternately for a predetermined distance in one direction for feeding the tool structures forward simultaneously and then for substantially the same distance in the opposite direction for withdrawing the tool structures simultaneously, said slip clutch being effective to determine the maximum pressure in the conduit means so that the maximum rate of advancement in each unit is determined by the tool resistance and the controlling action of its said regulating means at said maximum pressure.

19. A machine tool including a plurality of separate tool units each having a tool structure which is moved forward for cutting and moved backward for withdrawal and each including fluid-pressure-operated means for feeding and each including positive means for mechanically limiting the forward and backward movements thereof and means for regulating the supply of fluid to said fluid-pressure-operated means and for permitting a substantially free return of fluid from said fluid-pressure-operated means during the backward movement thereof, a reversible fluid-pressure pump, a single conduit connecting said pump with all the fluid-pressure-operated means, a reversible source of power, and transmission means including a slip clutch connecting said source and said pump so that the pump alternately delivers fluid to and withdraws it from said conduit according to the direction of movement of said source, and so that said slip clutch operates to limit the maximum pressure occurring in the single conduit while fluid is being delivered thereto for the forward movement of all the tool structures.

EDWARD JOSLIN KINGSBURY.